United States Patent [19]

Anderson et al.

[11] Patent Number: 5,106,202
[45] Date of Patent: Apr. 21, 1992

[54] APPARATUS FOR MEASURING THE TEMPERATURE OF A PISTON IN AN INTERNAL COMBUSTION ENGINE

[75] Inventors: Carl L. Anderson; Glen L. Barna, both of Houghton; Douglas B. Brumm, Calumet, all of Mich.

[73] Assignee: Board of Control of Michigan Technological University, Houghton, Mich.

[21] Appl. No.: 629,131

[22] Filed: Dec. 18, 1990

[51] Int. Cl.[5] .......................... G01J 5/08; G01K 1/08
[52] U.S. Cl. .................................. 374/144; 73/119 R; 250/231.1; 374/124
[58] Field of Search ............... 374/144, 163, 124, 130; 73/119 R; 250/231.1, 551; 340/513

[56] References Cited

U.S. PATENT DOCUMENTS

| | | |
|---|---|---|
| 3,983,754 | 10/1976 | Deguchi et al. |
| 3,999,383 | 12/1976 | Hanaoka |
| 4,020,814 | 5/1977 | Hewitt et al. |
| 4,055,058 | 10/1977 | Tewsley et al. ............... 250/551 X |
| 4,065,227 | 12/1977 | Rose et al. ............... 250/551 X |
| 4,078,531 | 3/1978 | Hewitt |
| 4,114,442 | 9/1978 | Pratt |
| 4,122,720 | 10/1978 | Podl |
| 4,361,036 | 11/1982 | Levenson |
| 4,376,277 | 3/1983 | Black, Jr. ........................ 340/513 X |
| 4,518,268 | 5/1985 | Swis et al. |
| 4,787,242 | 11/1988 | Shine |
| 4,794,261 | 12/1988 | Rosen ................................. 250/551 |
| 4,875,756 | 10/1989 | Estes et al. ...................... 250/551 X |

FOREIGN PATENT DOCUMENTS 1420430  8/1988  U.S.S.R. ................................ 73/119

Primary Examiner—Daniel M. Yasich
Attorney, Agent, or Firm—Michael, Best & Friedrich

[57] ABSTRACT

An apparatus for measuring the temperature of a piston in an internal combustion engine. The apparatus includes a thermistor to sense the temperature of the piston and generate an electrical signal representative of that temperature, a transmission unit connected to the thermistor for receiving the electrical signal and for converting the signal to an infrared beam for transmission to a point remote from the piston, and a receiver to receive the beam and convert the beam to an electrical signal corresponding to the electrical signal generated by the thermistor. The first mentioned electrical signal is converted to a rectangular wave form prior to transmission of the infrared beam.

21 Claims, 3 Drawing Sheets

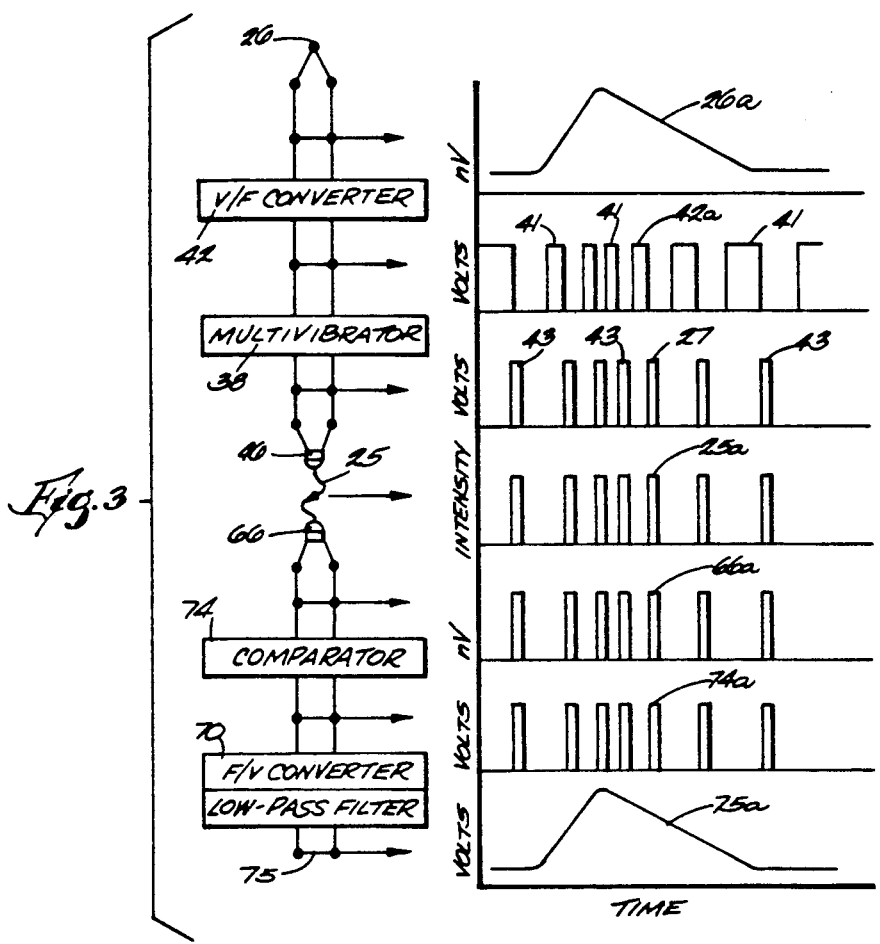
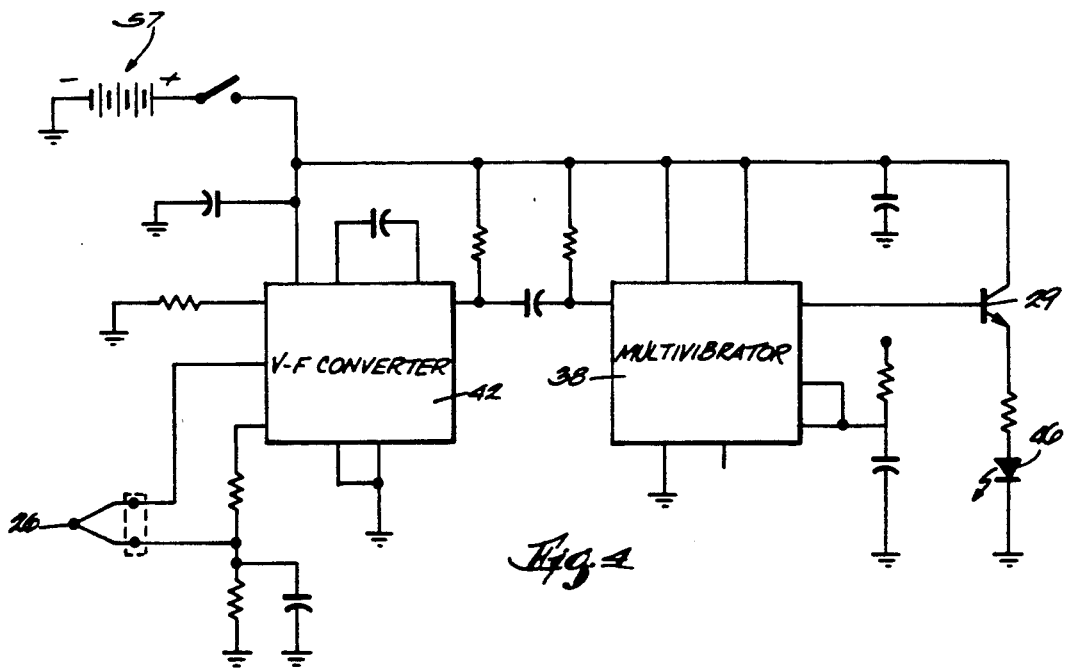

APPARATUS FOR MEASURING THE TEMPERATURE OF A PISTON IN AN INTERNAL COMBUSTION ENGINE

BACKGROUND OF THE INVENTION

1. Field of the Invention

This invention relates to devices for sensing selected conditions in confined areas and/or in combination with moving parts and, more particularly, to devices for sensing the temperature of a piston in an internal combustion engine.

2. Description of the Prior Art

This invention will be described as embodied in apparatus for monitoring piston temperatures in an internal combustion engine. It will be appreciated that a number of other applications are possible, for example to measure strain or vibration in a member or measure the temperature condition of a turbine blade.

There are a number of available technologies for sensing piston temperatures, but a major problem is to get the sensed condition out of the cylinder as a reliable, usable signal. For example, it has been proposed to bring the signal out of the engine using slip rings, radio telemetry, and mechanical linkages. These have a number of inherent problems. Slip rings are susceptible to electrical noise which affects reliability. Radio telemetry units are generally heavy and adversely affected by high "g" forces and elevated temperatures. Mechanical linkages are difficult to install, requiring extensive modifications to the engine, and are limited as to the speeds to which they can be exposed, i.e. engine RPM.

Another previous method proposed for measuring the temperature of a piston in an internal combustion engine is to incorporate a plug in the piston wherever a temperature reading is required. These plugs are made of a specially treated alloy capable of withstanding elevated temperatures for a specific period of time. But certain characteristics of the plug, e.g. hardness, are affected by the elevated temperatures, and changes in those characteristics are used to arrive at temperature measurement.

An example of this type of measurement system is disclosed in U.S. Pat. No. 4,787,282 issued Nov. 29, 1988 to Shine. In this patent an Aluminum-Copper alloy plug is incorporated into the piston. This plug can be a band integrally cast with the piston, a setscrew, or a wedge that is press-fit into the piston. This plug is subjected to a qualifying run of at least 100 hours and the hardness of the plug is then measured. The steady-state temperature of the piston is then calculated by reference to a calibration curve graphing hardness verses temperature for the given alloy mixture. A problem with this type of piston measuring device is that it will not respond to fast temperature transients on the surface of the piston. Further, these devices must be removed from the piston, sent to a laboratory to be tested for hardness, and then the temperature of the piston calculated from the calibration curve. This is a very time consuming process and is unacceptable where the temperature of the piston is needed immediately.

Devices of the type to which this invention relates will find important application as a research tool in selecting piston/cylinder materials and formulating fuel and lubrication products.

SUMMARY OF THE INVENTION

This invention provides an apparatus for measuring a condition on moving parts and/or within a confined space, for example, piston temperature in an internal combustion engine in which a sensor is mounted on the piston for sensing the temperature of the piston. The piston carries an optical signal transmitter which responds to the sensor and transmits a signal representative of the temperature received from the sensing means, preferably an infrared transmitter is used. The infrared signal is received externally of the piston and converted to an electrical signal representative of the temperature of the piston for further processing.

Preferably, a temperature responsive element senses the piston temperature and produces an electrical signal which corresponds, in a preselected manner, to the sensed temperature. Various types of elements can be used for temperature sensing, for example a thermocouple or thermistor. The preferred embodiment will be discussed as using a thermistor but other temperature sensitive elements may be used. The signal is processed through a voltage-frequency converter which produces a frequency signal that excites an infrared diode. The infrared diode transmits an infrared beam to a receiving infrared detector where the infrared beam excites the receiving detector. The receiving detector in turn generates a frequency signal corresponding to that produced at the voltage-frequency converter. A frequency-voltage converter reconverts the frequency signal to an analog signal corresponding to the sensed temperature which can then be used in further processing to produce a temperature read out. The voltage-frequency converter is selected to provide a rectangular wave. The rectangular wave pattern is preferred as it distinguishes the sensed signal from background infrared emissions and/or electrical noise present in the engine environment, thereby enhancing the reliability of the unit.

A principal object of the invention is to provide an apparatus for measuring the steady state temperature of a piston in an internal combustion engine.

Another principal object of the invention is to provide an apparatus for measuring the temperature of a piston in an internal combustion engine which is capable of measuring rapid temperature transients on the surface of the piston.

Another principal object of the invention is to provide a wireless, telemetry technique for measuring the temperature of a piston in an internal combustion engine.

Another principal object of the invention is to provide an apparatus for measuring the temperature of a piston in an internal combustion engine which will be affected very little by the ignition noise in spark ignited engines, or by other electrical noise encountered in an engine environment.

Another principal object of the invention is to provide an apparatus for measuring the temperature of a piston in an internal combustion engine which can be installed in an engine with very little custom fitting or engine modifications.

Another principal object of the invention is to provide an apparatus for measuring the temperature of a piston in an internal combustion engine at high engine speeds.

Other principal objects and advantages of the invention will become apparent to those skilled in the art upon review of the following detailed description, claims and drawings.

BRIEF DESCRIPTION OF THE DRAWINGS

FIG. 3 is a schematic signal flow diagram of the infrared telemetry unit of the present invention.

FIG. 4 is a schematic of the transmitter.

Figure 1:
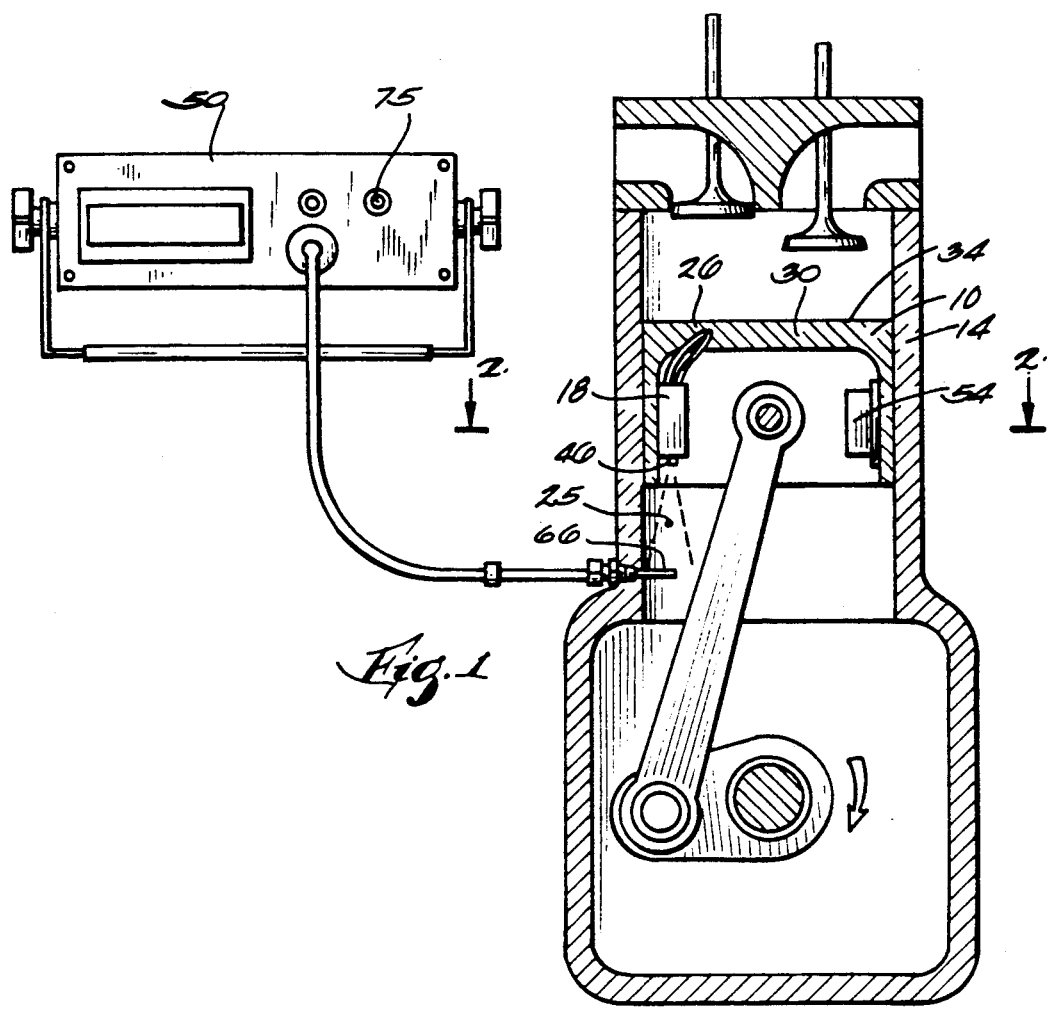
FIG. 1 is a generally schematic view of an engine cylinder embodying the present invention partially broken away to expose the piston and cylinder interior.

Before the following embodiments of the invention are explained in detail, it is to be understood that the invention is not limited in its application to the details of construction and the arrangement of components set forth in the following description or illustrated in the drawings. The invention is capable of other embodiments and of being practiced or being carried out in other applications. Also, it is to be understood that the phraseology and terminology used herein is for the purpose of description and should not be regarded as limiting.

DESCRIPTION OF THE PREFERRED EMBODIMENT

Apparatus for measuring the temperature of a piston 10 inside a cylinder 14 of an internal combustion engine is illustrated in the drawings.

An infrared transmitter 18 is mounted on and otherwise operatively associated with a piston 10 of an internal combustion engine. In addition to transmitter 18, an infrared telemetry unit includes a, a sensor 26, and receiver 50 external of the cylinder.

The sensor 26 is in the form of a thermistor, or other sensing means suitable for sensing the temperature of the piston 10 such as a thermocouple. The temperature of the piston crown 30 is the temperature to be sensed. To that end, the thermistor is embedded in the piston to be influenced directly by the temperature, and changes in temperature, of the piston during engine operation. Any one of a number of commercially available thermistors can be used.

As an example, the mounting of the thermistor 26 to the piston 10 can be performed by first preparing the thermistor, in a conventional manner, to be mounted in the piston. The thermistor has a particular diameter and a bore is drilled in the piston surface 34 to accommodate the prepared thermistor. This bore can be drilled in the center of the piston crown (however for illustrative purposes it is shown off-center in the drawings) or at any area in the piston where the temperature is to be measured. When the bore is in the piston crown, the bore is also preferably drilled to a depth such that the thermistor is near the top of the piston crown surface. The thermistor 26 is then epoxied, or otherwise suitably anchored, to the piston by an epoxy which is capable of withstanding temperatures in the range of 100°–400° C. An example of such an epoxy is EPO-TEK 377 manufactured by Epoxy Technology Incorporated.

Figure 5:
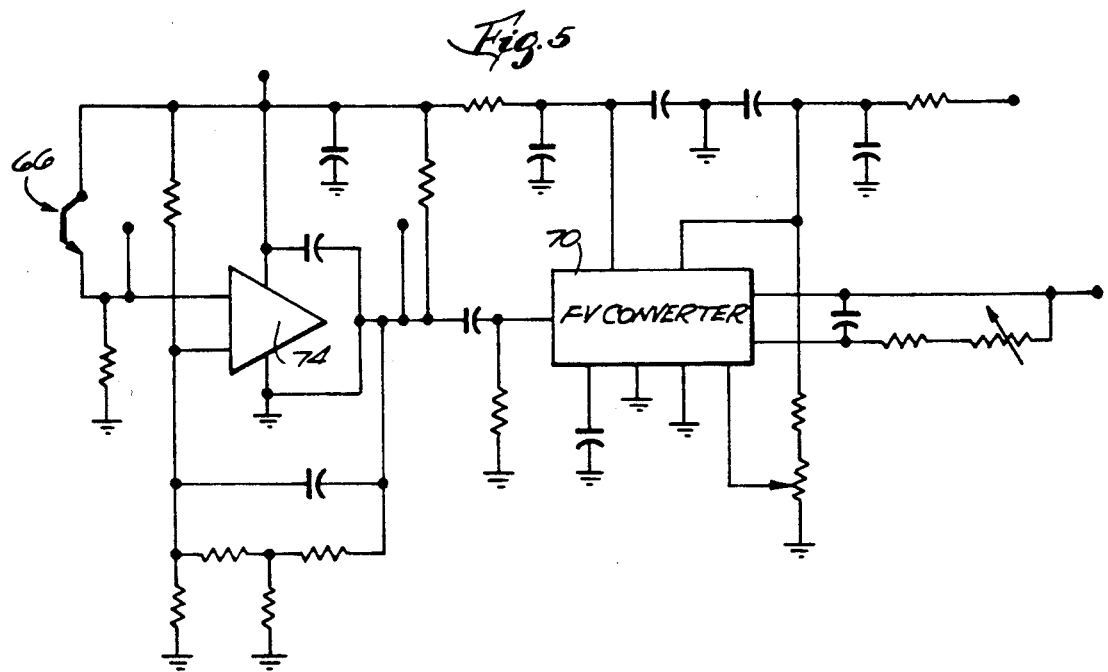
FIG. 5 is a schematic of the receiver.
Figure 6:
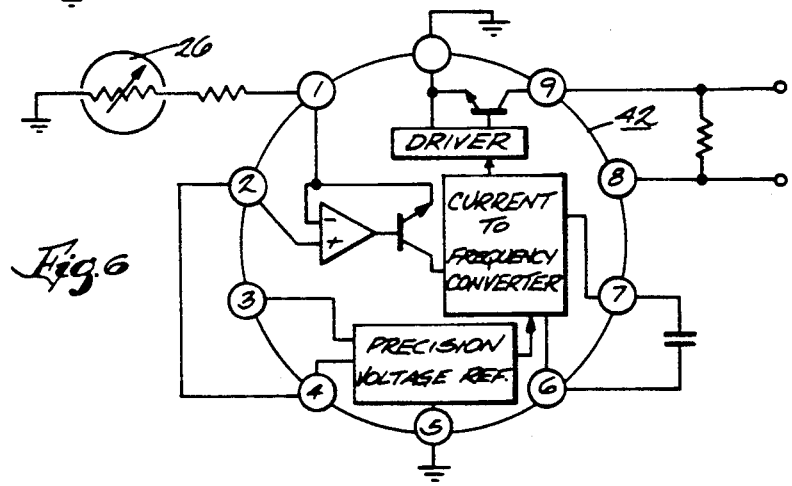
FIG. 6 is an enlarged, more detailed illustration of the voltage-to-frequency converter in combination with a thermistor.

The transmitter 18 receives the electrical signal from the thermistor 26 and generates an infrared signal representative of temperature based on the current through the thermistor. With reference to FIGS. 3, 5, and 6, transmitter 18 includes a conventional voltage-to-frequency converter 42 and a monostable multivibrator 38. The voltage-to-frequency converter 42 receives the signal from the thermistor 26 and then produces a positive square wave 42a with a frequency related to the current through the thermistor. The square wave 42a is converted, by the multivibrator 38, to a rectangular wave 38a having relatively narrow discrete portions 43. More particularly, a train of narrow, discrete rectangular wave pulses is generated (wave 38a) off of the trailing edges of the discrete portions 41 of wave 42a.

The voltage-to-frequency converter 42 is preferably a monolithic chip consisting of an input amplifier, a precision oscillator system, and an accurate internal reference generator. An example of such a voltage-to-frequency converter is the commercially available AD 537 sold by Analog Devices.

More particularly, the input signal from the thermistor is received at pin 1 (FIG. 6). It is processed against the reference voltage at pin 3 and transmitted as a square wave through pin 9. The thermistor 26 functions as a variable resistor at pin 1, thereby changing the calibration of the voltage-to-frequency converter as the thermistor changes temperature.

Figure 7:
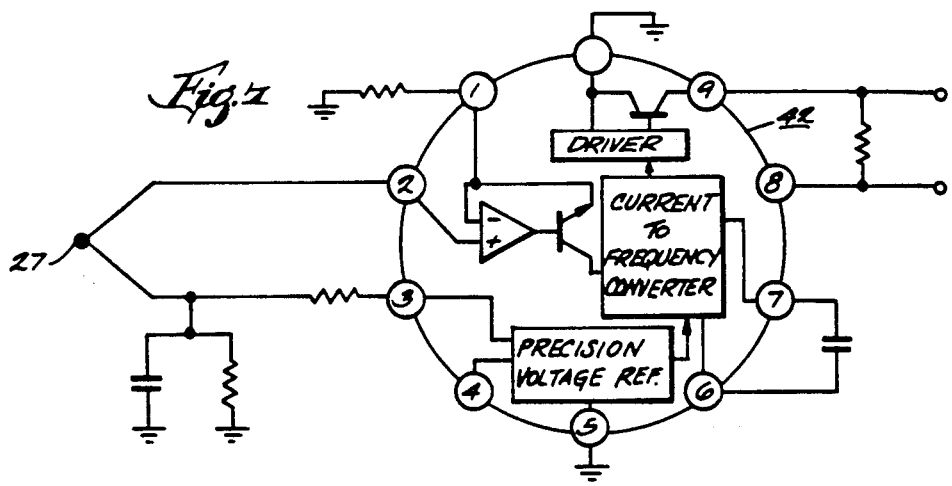
FIG. 7 is an enlarged, more detailed illustration of the frequency-to-voltage converter but with a thermocouple as the sensing element.

In FIGS. 4 and 7, an alternative embodiment using a thermocouple 27 in place of the thermistor, to provide the input signal. Except for the thermocouple, the voltage-to-frequency converter is the same as that of FIG. 6.

The transmitter 18 includes an infrared diode 46 which receives the pulse signal from the monostable multivibrator (Pin 3) through driver transistor 29. The infrared diode generates beam 25 (FIG. 1) for optical transmission to a receiving unit 50. Infrared light was chosen to transmit the signal to the receiving unit 50 rather than visible light because the transmission unit and photo detector 66 are in an environment of heavy concentrations of oil and gas. This would make transmission by visible light difficult due to the absorption and dispersion of light by the oil and gas droplets, infrared is generally not so affected.

The infrared diode 46 is preferably a gallium arsenide light emitting diode potted solidly in a clear plastic case with a convex lens. The lens selected produced a 50% power beam angle of 16° to maintain the high radiant intensities needed to penetrate the optically thick atmosphere of an engine crankcase.

The transmission unit also includes a power source for the transmitter. This power source 54 must be able to provide a minimum 4.5 volts to the transmitter and also be small enough and light enough to permit installation on the piston. A suitable power source is the commercially available lithium-thionyl chloride battery.

Even though the monostable multivibrator is used, it is also possible to include means 57 (FIG. 4) for switching the batteries on and off in order to preserve the battery life. Switch 57 is conventional and for that reason is shown schematically and not in detail. It preferably operates to open and close at around 30°–60° C.

Figure 2:
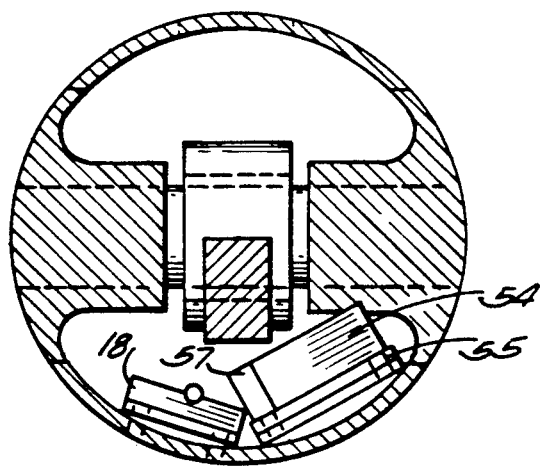
FIG. 2 is sectional view through line 2—2 in FIG. 1 illustrating the location of the transmitter and the battery.

The transmitter 18 is preferably mounted on the inside of the piston skirt as shown in FIG. 1. The power source 54 and the remainder of the transmission unit are mounted separately to the inside of the piston skirt (FIG. 2) as an example. The entire transmission unit is potted in a suitable potting compound and fastened to the piston.

The infrared telemetry unit also includes a receiving unit 50 located outside of the engine. This receiving unit 50 receives the infrared signal from the transmitter 18 and converts this signal to an electrical signal at 75 which is representative of the temperature of the piston.

The receiving unit 50 comprises an infrared photo detector 66, a comparator 74, and a conventional frequency-to-voltage converter 70. The comparator is an LM 393 available commercially from several manufacturers and the frequency-to-voltage converter is an AD 650 available commercially from Analog Devices.

The photo detector 66 is mounted through a hole in the engine block. The photo detector 66 must be able to withstand the oil and gas atmosphere in which it is situated and still be sensitive enough to pick up the signal from the transmitter. Therefore, the photo detector is placed in some type of containing means, such as a metal tube, before it is mounted through the engine block. A suitable, commercially available photo detector is an NPN silicon photo transistor manufactured by TRW.

Before the signal is sent to the frequency-to-voltage converter 70, the signal must be amplified because the signal from the photo detector may only be a few millivolts at certain times. A comparator 74 is used to convert the weak and possibly noisy signal from the photo detector to a clean rectangular wave. A suitable comparator is the LM 393.

The edges of the pulses produced by the comparator 74 are used to trigger the frequency-to-voltage converter 70 where the signal is converted to a voltage representative of the temperature of the piston where the thermistor is located. The frequency-to-voltage converter output may have a ripple and, if necessary, a low-pass filter could be used to remove this ripple (shown schmatically in FIG. 3).

Reference will now be made to FIG. 3. Thermistor 26 senses the piston temperature and produces an electrical signal having a current characteristic illustrated by curve 26a. This signal is processed by the voltage-to-frequency converter 42 to produce a square wave signal 42a. Signal 42a excites the monostable multivibrator 38 to convert the square wave to a rectangular wave 38a made up of discrete narrow pulses 41. These pulses turn the transistor 29 on and off causing infrared diode 46 to generate an infrared beam 25 having the same frequency 25a as signal 38a. Beam 25 is received at the photo detector and excites infrared detector 66 converting the infrared beam 25 to an electrical signal 66a having the same frequency as signal 38a. Signal 66a is amplified at 74 producing signal 74a. In frequency-to-voltage converter 70 signal 74a is converted from a rectangular wave to the analog wave form 75a which duplicates the signal 26a from the thermistor.

The conversion of the sensor output to an infrared pulse train for optical transmission is preferred because this type of signal:
a) is easily distinguished from background infrared emissions;
b) is not affected by engine speed;
c) penetrates oil/fuel mist in engine crankcase; and
d) is not affected by electrical noise.

Various features of the invention are set forth in the following claims.

We claim:

1. Apparatus for monitoring a preselected condition of a moving member in a confined area comprising, in combination, sensing means operatively connected to said moving member for sensing the said preselected condition and operative to generate a first electrical signal corresponding to the sensed condition, transmission means operatively connected to said sensing means for receiving said first electrical signal, for converting said first electrical signal to an optical beam, and for transmitting said optical beam to a point remote from said moving member, receiving means separate from said moving member for receiving said optical beam and operative to convert said optical beam into a second electrical signal corresponding to the first electrical signal generated by said sensing means, and said receiving means including a portion located in the area of said moving member and also including a portion remote from said moving member and operatively connected to said sensing means in the area of said moving member for converting said beam into said second electrical signal.

2. Apparatus for monitoring the temperature of a piston in an internal combustion engine comprising, in combination, means for sensing the temperature of the piston and operative to generate a first electrical signal corresponding to the sensed temperature, transmission means operatively connected to said sensing means for receiving said first electrical signal, for converting said first electrical signal to an optical beam, and for transmitting said beam to a point remote from said piston, receiving means separate from said piston for receiving said beam and operative to convert said beam into a second electrical signal corresponding to the first electrical signal generated by said sensing means, and said receiving means including a portion located within the cylinder which houses said piston for receiving said beam and also including a portion external of the cylinder operatively connected to the portion of said sensing means within said cylinder for converting said beam into said second electrical signal.

3. The apparatus of claim 2 wherein said beam converted from said first electrical signal by said transmission means is an infrared beam and said receiving means is operative to convert said infrared beam to said second electrical signal.

4. The apparatus of claim 3 wherein said transmission means is operative in converting said first electrical signal to said infrared beam to generate said infrared beam in a rectangular wave form.

5. The apparatus of claim 4 wherein said transmission means is operative to convert said first electrical signal as well as said infrared beam to a rectangular wave form.

6. The apparatus of claim 4 wherein said transmission means includes infrared detecting means operative in response to impingement thereon of an infrared beam to generate said second electrical signal, and including means supporting said infrared detecting means within said cylinder and extending through said cylinder wall to said receiving means for transmitting the second electrical signal generated by said infrared detecting means to said receiving means external of said cylinder.

7. Apparatus for monitoring the temperature of a piston in an internal combustion engine, said piston having a crown and a skirt and being positioned in a cylinder, said apparatus comprising, in combination,
   a temperature sensor exposed to the temperature of said piston crown and operative to generate an electrical signal which is representative of the sensed temperature,
   a transmitter attached to the inner wall of said skirt and electrically connected to said sensor, said transmitter including a voltage-to-frequency converter receiving said signal and connected to an infrared generator, said converter converting said signal to a rectangular wave form, said infrared generator receiving said converted rectangular wave form signal and generating an infrared beam having a square wave form the frequency of which corresponds to the frequency of said converted electrical signal,
   infrared detector means separate from said piston and positioned in the path of said infrared beam for receipt thereof and generating a second electrical signal responsive to said infrared beam, and
   means operatively connected to said infrared detector means including frequency-to-voltage conversion means operative to convert the wave form infrared beam to a signal having a wave form representing the wave form of the signal generated by temperature sensor.

8. The apparatus of claim 7 wherein said infrared detector means is located within said cylinder in the path of said beam and said apparatus includes means extending through the walls of said cylinder to said frequency-to-voltage conversion means for transmitting the electrical signal generated by said infrared detector to said frequency-to-voltage conversion means.

9. Apparatus for measuring the temperature of a piston in an internal combustion engine comprising:
   sensing means for sensing the temperature of a piston, said means being mounted on the piston;
   means operatively connected to said sensing means and responsive to said sensed piston temperature for transmitting an infrared signal representative of temperature of said piston as sensed by said sensing means; and
   means for receiving said infrared signal and converting said signal to an electrical signal representative of said piston temperature.

10. The apparatus of claim 9 wherein said sensing means is a thermistor.

11. The apparatus of claim 9 wherein said sensing means is a thermocouple.

12. The apparatus of claim 9 wherein said transmitting means is mounted on the inside of the piston skirt.

13. The apparatus of claim 9 wherein said transmitting means includes a voltage-to-frequency converter.

14. The apparatus of claim 13 wherein said transmitting means further includes an infrared light emitting diode.

15. The apparatus of claim 14 wherein said transmitting means further includes a power source.

16. The apparatus of claim 15 wherein said power source is a lithium-thionyl chloride battery.

17. The apparatus of claim 15 which further includes a thermal switch for activating and deactivating said power source.

18. The apparatus of claim 9 wherein said receiving means is located outside of the engine.

19. The apparatus of claim 9 wherein said receiving means further comprises an infrared photo detector.

20. The apparatus of claim 19 where said receiving means includes a frequency-to-voltage converter.

21. A method of measuring the temperature of a piston of an internal combustion engine comprising the steps of:
   sensing the temperature of the piston and producing an electrical signal corresponding to this temperature;
   converting the electrical signal to a frequency infrared beam; and
   transmitting the infrared beam to a receiving unit where it is reconverted to a voltage representative of the temperature of the piston.

* * * * *